US006723924B2

(12) United States Patent
Yuasa et al.

(10) Patent No.: US 6,723,924 B2
(45) Date of Patent: Apr. 20, 2004

(54) ELECTRICAL CONDUCTOR ASSEMBLY

(75) Inventors: Eriko Yuasa, Mie (JP); Shuji Yamakawa, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 10/623,823

(22) Filed: Jul. 21, 2003

(65) Prior Publication Data

US 2004/0040732 A1 Mar. 4, 2004

(30) Foreign Application Priority Data

Sep. 3, 2002 (JP) ....................................... 2002-257728

(51) Int. Cl.[7] .................................................. H02G 5/00

(52) U.S. Cl. ...................... 174/68.2; 174/50; 174/71 B; 174/72 B; 361/637; 439/76.2; 439/949

(58) Field of Search ............................... 174/50, 50.52, 174/50.54, 50.56, 52.1, 70 B, 68.2, 71 B, 72 B, 149 B, 129 B, 99 B; 361/637; 439/76.2, 949

(56) References Cited

U.S. PATENT DOCUMENTS

| | | | | | |
|---|---|---|---|---|---|
| 4,705,334 | A | * | 11/1987 | Slicer et al. | 174/68.2 |
| 4,867,696 | A | * | 9/1989 | Demler et al. | 174/72 B |
| 5,543,581 | A | * | 8/1996 | Kurata et al. | 174/52.1 |
| 5,742,005 | A | * | 4/1998 | Saka et al. | 361/637 |
| 6,310,293 | B1 | * | 10/2001 | Kawakita | 174/68.2 |
| 6,325,640 | B1 | * | 12/2001 | Kasai | 174/71 B |
| 6,430,054 | B1 | * | 8/2002 | Iwata | 439/76.2 |
| 6,506,061 | B2 | * | 1/2003 | Yuasa et al. | 439/76.2 |
| 6,607,115 | B2 | * | 8/2003 | Kobayashi et al. | 439/76.2 |
| 6,624,354 | B1 | * | 9/2003 | Martinez | 174/50 |

FOREIGN PATENT DOCUMENTS

| | | |
|---|---|---|
| JP | 07-176338 | 7/1995 |

* cited by examiner

*Primary Examiner*—Dean A. Reichard
*Assistant Examiner*—Adolfo Nino
(74) *Attorney, Agent, or Firm*—Harness, Dickey & Pierce, P.L.C.

(57) ABSTRACT

An electrical conductor assembly adapted to be contained in an electrical connection box to be mounted on an automobile has a bus bar produced by punching an aluminum-based metal plate into a desired circuit configuration. The bus bar has a press contact tab formed by bending an end of the bus bar. A reinforcement tab cover encloses an exterior of the press contact tab. The press contact tab is provided with a press contact slot that extends from a distal end of the tab to a proximal end of the tab. The tab cover is made of an elastic iron-based metal plate. The tab cover has insertion grooves in opposed sidewalls that communicate with the press contact slot in the press contact tab.

6 Claims, 6 Drawing Sheets

FIG - 2
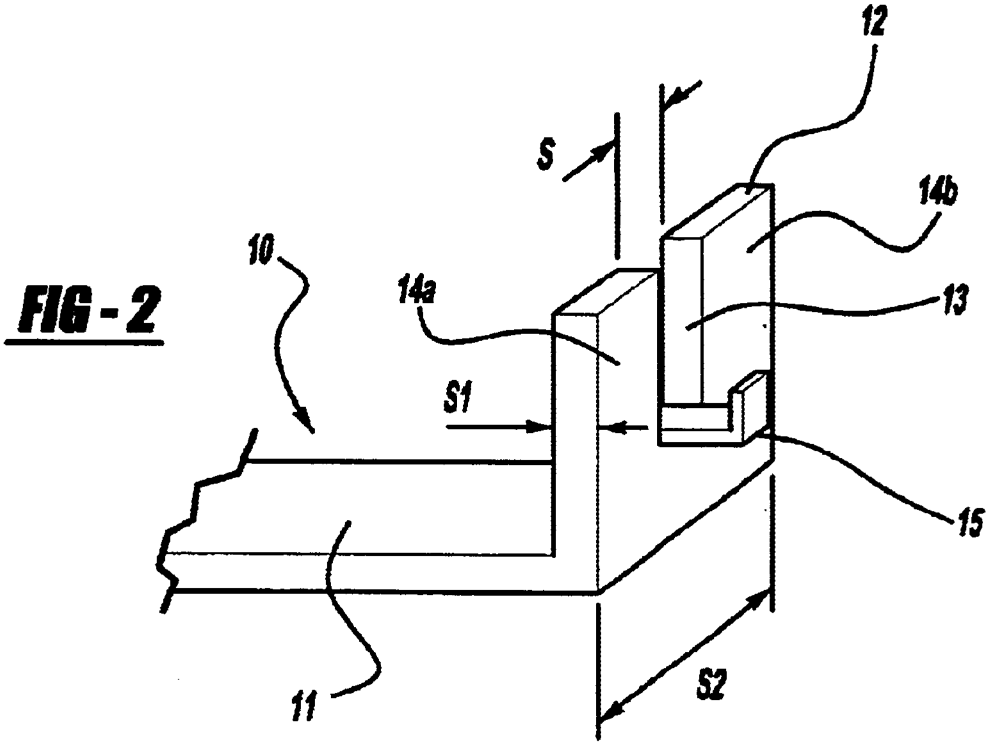
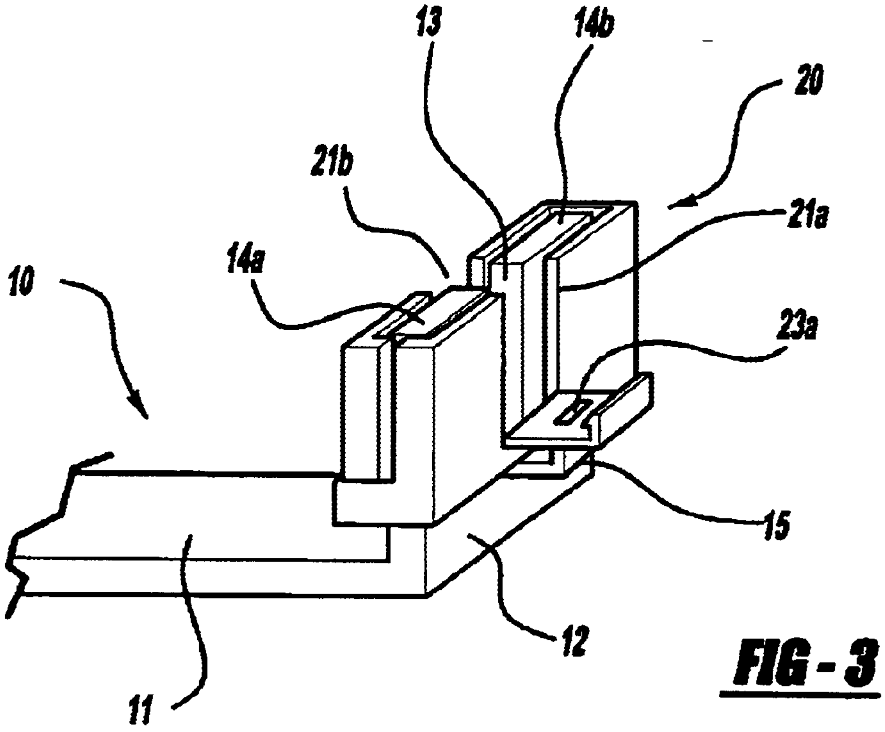
FIG - 3

ELECTRICAL CONDUCTOR ASSEMBLY

CROSS-REFERENCE TO RELATED APPLICATIONS

This application claims priority to Japanese Patent Application No. 2002-257728 filed Sep. 3, 2002, which application is herein expressly incorporated by reference.

FIELD OF THE INVENTION

The present invention relates to an electrical conductor assembly and, more particularly, to an electrical conductor assembly, including a bus bar, arranged as an internal circuit in an electrical connection box, such as a junction box or the like, to be mounted on an automobile. The bus bar is made of a much recyclable material.

BACKGROUND OF THE INVENTION

Heretofore, bus bars have been produced by being punched out of an electrical conductive material. The bus bars are contained as internal circuits in an electrical connection box such as a junction box or the like.

For convenience of explanation, a conventional electrical conductor assembly will be described by referring to FIGS. 7 and 8. FIG. 7 is an exploded perspective view of a conventional electrical connection box. FIG. 8 is an explanatory view that illustrates problems in the conventional electrical connection box.

As shown in FIG. 7, an electrical connection box 1 includes a casing with an upper casing member 2 and a lower casing member 5. Bus bars 4 and insulation plates 3 are laminated alternately on each other in the casing. An end of each bus bar 4 is bent to form a tab 4*a*. The tabs 4*a* penetrate a connector containing section 2*a* in the upper casing 2, a fuse containing section 2*b*, and a relay containing section 2*c* directly or through intermediate terminals. The tabs 4*a* are connected to a connector C coupled to a wire harness W/H, a fuse F, and a relay R.

The bus bars 4, constituting the internal circuits, are made of a copper-based metal plate having high electrical conductivity. After punching the copper-based metal plate into bus bars 4, having desired circuit configurations, a desired end of each bus bar 4 is bent to form a tab 4*a*.

Recently, requirements to enhance the recyclability of junked automobiles have been instituted. Iron makes up the highest percentage of an automobile. When a junked automobile is thrown into an incinerator to recover and recycle iron, it is required that a mixing rate of copper to iron should be less than 0.1%. This prevents the iron from being denatured due to a reaction with the copper.

Since the bus bars 4 are made of copper-based metal plate, as described above, it is preferable to remove the bus bars 4 from the car body upon disassembly of the automobile. The bus bars 4 are separated from the car body made of an iron-based metal. However, the electrical connection box must be disassembled in order to remove the bus bars from the electrical connection box 1. This work requires extensive manpower and is not practical.

To avoid interference with iron recovery, from a practical recycling standpoint, the bus bar should be selected from an aluminum-based metal material that will not denature the iron reaction.

However, as shown in FIG. 8, there is a problem in the following case. A bus bar 4' is made of an aluminum-based metal. An end of the bus bar 4' is bent to form a tab 4*a*'. A press contact slot 4*b* is formed in the tab 4*a*'. A terminal T of a fuse or a relay, or a male terminal T contained in a connector is forcedly pushed into the press contact slot 4*b*.

In this type of press contact connection, the press contact slot 4*b* is a narrow U-shaped groove having a width S smaller than a thickness of a terminal T. Although the terminal T widens the press contact slot, opposite wings of the tab return to their original positions by their elastic recovery forces, thereby forming a stable press contact connection.

Heretofore, since the bus bar having the tab is made of a copper-based metal plate having elasticity, a stable press contact connection can be obtained. However, since the aluminum-based metal has no elasticity, wings 4*c* on the opposite sides of the press contact slot 4*b* cannot return from the widened positions to the original positions. Accordingly, this does not exert a desired contact pressure.

SUMMARY OF THE INVENTION

In view of the above problem, an object of the present invention is to provide an electrical conductor assembly where bus bars are made of an aluminum-based metal plate in order to enhance recyclability of the automobile. Also, a tab formed on the bus bar is not deformed.

In order to achieve the above object, the present invention is directed to an electrical conductor assembly adapted to be contained in an electrical connection box to be mounted on an automobile. The assembly includes a bus bar produced by punching an aluminum-based metal plate into a desired circuit configuration. The bus bar includes a press contact tab formed by bending the end of the bus bar. A tab cover, for reinforcement, encloses an exterior of the press contact tab. The press contact tab has a press contact slot that extends from a distal end of the tab to a proximal end of the tab. The tab cover is made of an iron-based metal plate having elastic characteristics. The tab cover is provided in opposed sidewalls with insertion grooves that communicate with the press contact slot in the press contact tab.

Since the bus bar is made of an aluminum-based metal, the mixing rate of copper to iron can be reduced. This reduces the problem upon recovery of iron during recycling of a car body in the prior art. It is also possible to enhance recyclability for junked automobiles. In addition, the bus bars made of aluminum-based metal have rust-resistance characteristics and good workability and help to provide a lightweight electrical connection box.

The tab cover made of an iron-based metal plate, such as a stainless steel plate or the like having elasticity, is mounted on the press contact tab of the bus bar made of an aluminum-based metal plate. An elastic recovery force is exerted in the tab cover. This force will return the wings on the opposite sides of the press contact slot in the tab from deformed positions, upon press contact connection, to the original positions while maintaining a desired contact pressure between the mating terminal and the wings of the tab.

Furthermore, the tab cover encloses the press contact tab. This reinforces the tab to prevent the press contact tab from buckling under excessive pushing force.

The tab cover is preferably made of a stainless steel plate having high elasticity. Since the stainless steel plate and the aluminum plate are different kinds of metals, no electric erosion will occur between the plates. Accordingly, the stainless steel plate is most suitable.

The tab cover is made of a stainless steel plate. The bus bar may be contained in the electrical connection box after the tab cover is fixed on the press contact tab. Alternatively, the press contact tab may engage the tab cover that is fixed on the electric connection box beforehand, when the bus bar is contained in the electric connection box.

If the tab cover includes a locking piece that passes through and engages with a locking aperture formed in the electrical connection box, it is possible, beforehand, to attach the tab cover to the box. It is also possible, beforehand, to attach the tab cover to the box with the press contact tab mounting the tab cover.

The press contact tab is provided with a locking pawl. The tab cover has a locking piece that engages the locking pawl. The tab cover is locked on the press contact tab. This prevents the tab cover from coming out from the tab. A locking piece on the tab cover may be used as a common locking piece for the box. The tab cover is formed into a rectangular parallelepiped tube that fits closely around the exterior of the press contact tab.

The press contact tab includes wide surfaces including the press contact slot and narrow end surfaces arranged perpendicular to the wide surfaces. The tab cover is provided on sidewalls opposed to the narrow end surfaces of the tab with arcuately and inwardly expanded spring sections. The expanded spring sections elastically clamp the narrow end surfaces of the tab with each other to bias the tab so as to approach wings on opposite sides of the press contact slot.

The spring sections are further provided on the tab cover. The tab cover is elastic and is made of the iron-based metal. The spring sections bias the wings on the opposite sides of the press contact slot to approach each other. Accordingly, it is possible to surely maintain a press contact connection, even if the press contact tab is made of a non-elastic aluminum-based metal plate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a perspective view of a bus bar to be used in the first embodiment of an electrical conductor assembly in accordance with the present invention;

FIG. 3 is a perspective view of a press contact tab of the bus bar on which the tab cover is mounted;

DETAILED DESCRIPTION OF THE PREFERRED EMBODIMENTS

Figure 1A:
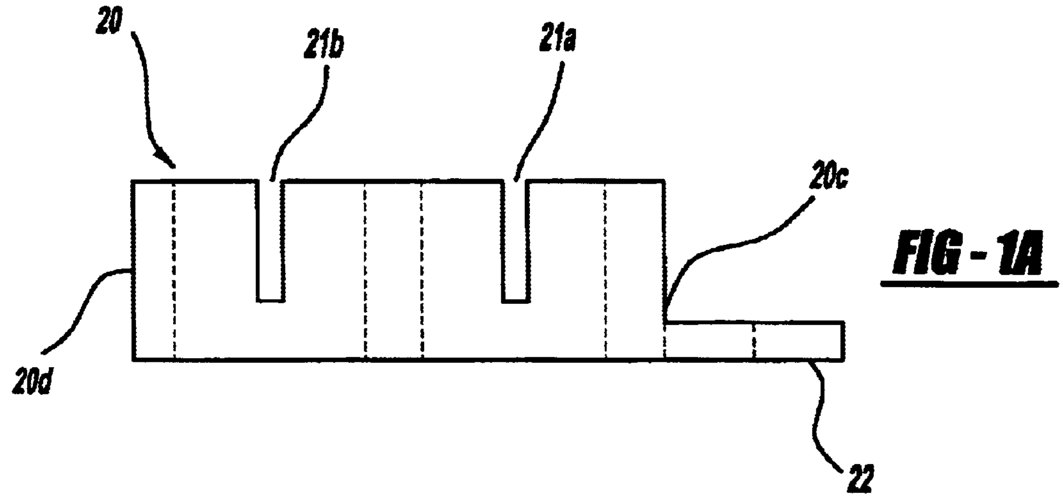
FIG. 1A is a plan view of a tab cover to be used in a first embodiment of an electrical conductor assembly in accordance with the present invention.

Embodiments of an electrical conductor assembly in accordance with the present invention will be described below by referring to the drawings.

FIGS. 1 to 3 show a first embodiment of the electrical conductor assembly in accordance with the present invention.

Figure 7:
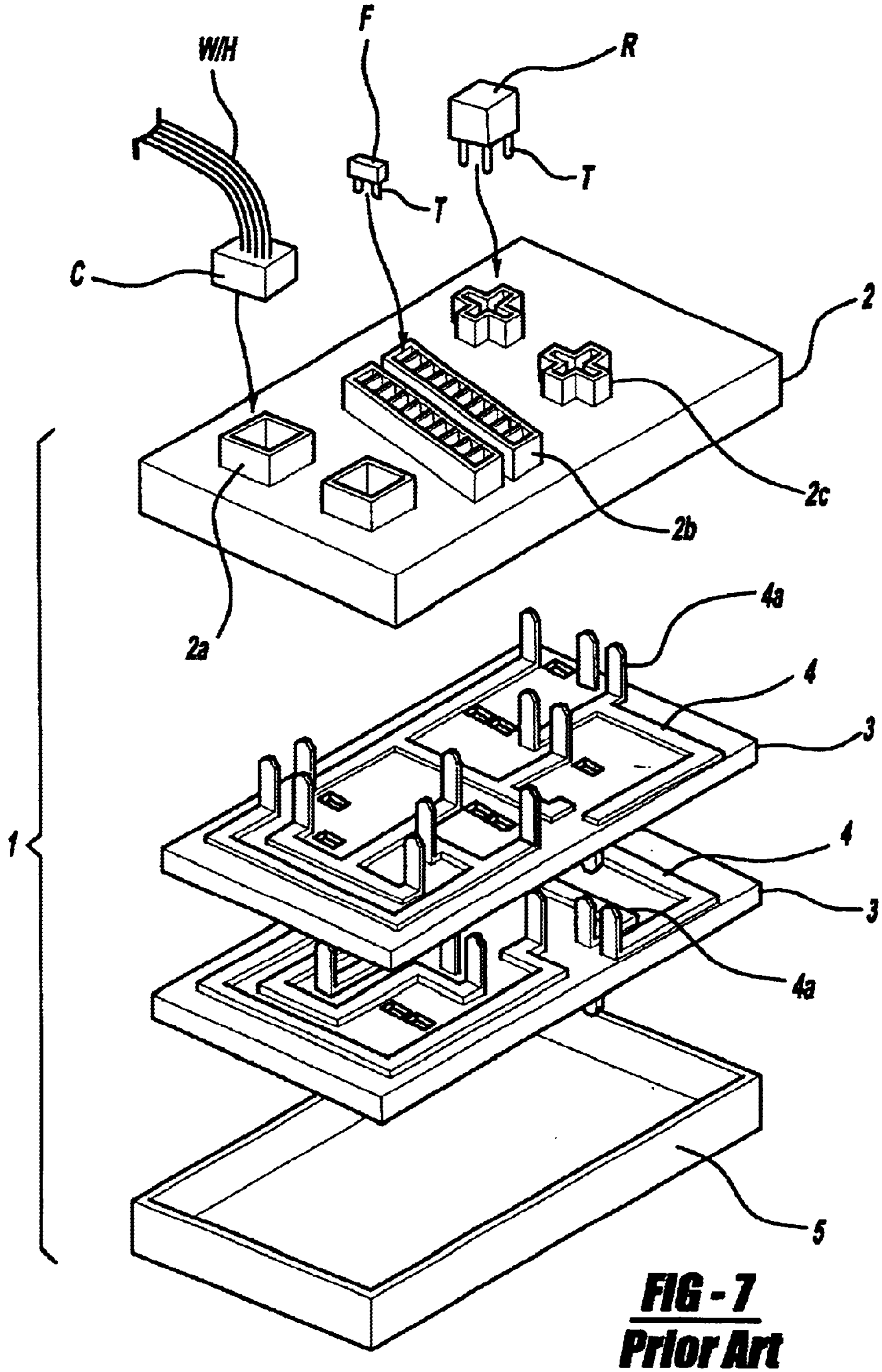
FIG - 7 Prior Art
FIG. 7 is an exploded perspective view of a conventional electrical connection box.
Figure 8:
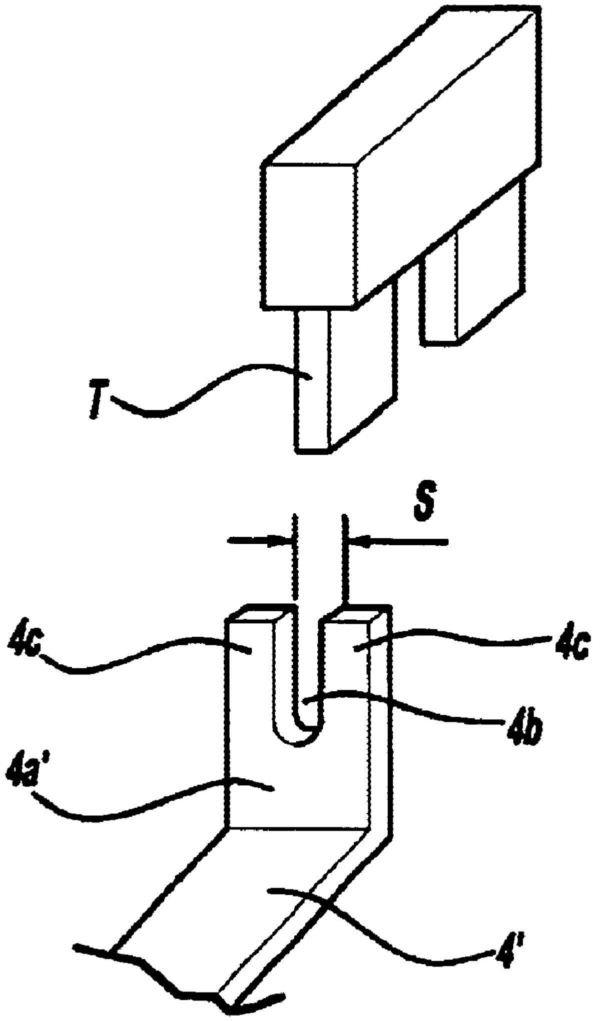
FIG - 8 Prior Art
FIG. 8 is an explanatory view that illustrates problems in the conventional electrical connection box.

A bus bar 10 shown in FIG. 2 is disposed on an insulation plate 3 as an internal circuit in the electrical connection box 1 for an automobile shown in FIG. 7.

The bus bar 10 is produced by punching a flat aluminum plate into a desired circuit configuration. An end of a flat section 11 of the bus bar 10 is bent to form a press contact tab 12. The press contact tab 12 has a central portion in a width direction with a narrow U-shaped press contact slot 13. The contact slot 13 extends from a distal end of the tab 12 to a proximal end of the tab 12. The press contact slot 13 in the press contact tab 12 has a width S set to be smaller than a thickness of a terminal T of a fuse or a relay to be pushed into the slot 13. When the terminal T is pushed into the press contact slot 13, wings 14*a* and 14*b* deform outwardly on the opposite sides of the press contact slot 13. However, the wings 14*a* and 14*b* do not return to the original positions, since the tab 12 has no elasticity.

The bus bar 10 may be made of not only pure aluminum but also an aluminum alloy, such as Al—Mg, Al—Mn, Al—Mg—Si, Al—Zn—Mg, Al—Si, or the like. A conductivity of pure aluminum is 60% of that of copper while conductivity of an aluminum alloy is 30% of copper. It will be preferable to use pure aluminum from a conductivity viewpoint.

A tab cover 20 is made of a stainless steel plate and encloses an exterior of the press contact tab 12.

Figure 1B:
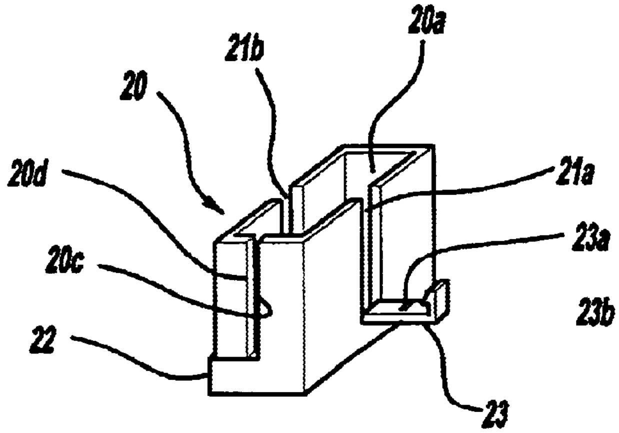
FIG. 1B is a perspective view of the tab cover in a first embodiment of an electrical conductor assembly in accordance with the present invention.
Figure 1C:
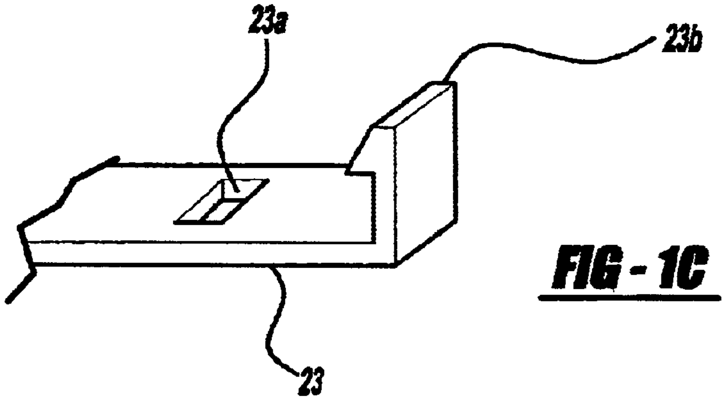
FIG. 1C is an enlarged perspective view of a part of the tab cover shown in FIG. 1B.

The stainless steel plate is punched into a configuration shown in FIG. 1A. The punched stainless steel plate is folded at broken lines to form a rectangular parallelepiped tube shown in FIG. 1B. An internal space 20*a* in the rectangular parallelepiped tube has dimensions that closely fit the press contact tab 12. A dimension of a long side of the internal space 20*a* accords with a width S2 (FIG. 2) of the press contact tab 12 to clamp the wings 14*a* and 14*b* on the opposite sides of the press contact slot 13 in the press contact tab 12. A dimension of a short side of the internal space 20*a* substantially accords with a thickness S1 (FIG. 2) of the press contact tab 12. However, a small clearance may be defined between the short side of the internal space 20*a* and the thickness of the press contact tab 12.

The tab cover 20 is provided in positions opposed to the press contact slot 13, with tab insertion grooves 21*a* and 21*b*. Accordingly, the tab cover 20 does not interfere with a terminal to be inserted into the slot 13.

When the punched stainless steel plate is folded to form the tab cover 20, a protrusion piece 22 is provided on an end edge 20*c* of the tab cover 20. The protrusion piece 22 engages an end edge 20*d* of the tab cover 20 so that the end edges 20*c* and 20*d* are not separated from each other when the punched stainless steel plate is folded into the rectangular parallelepiped tube.

The tab insertion groove 21*a* is provided on a bottom with an outwardly bent locking piece 23. A locking aperture 23*a* is formed in the locking piece 23 to receive the press contact tab 12. A locking pawl 23*b* (FIG. 1C) is provided on a distal end of the locking piece 23 to secure the tab cover 20 to the electrical connection box 1.

The locking aperture 23*a* receives an L-shaped locking pawl 15. The locking pawl 15 projects from the bottom of the press contact slot 13 in the press contact tab 12.

The bus bar 10 is made of the aluminum-based metal plate and the tab cover 20 is made of a stainless steel plate. The two are secured together with each other beforehand by inserting the press contact tab 12 of the bus bar 10 into the internal space 20*a* in the tab cover 20. Also, the locking pawl 15 is inserted into the locking aperture 23*b* to lock them together. Under this condition, the assembly of the bus bar 10 and tab cover 20 is contained in the electrical connection box 1. The locking pawl 23*b* of the tab cover 20 engages a locking aperture (not shown) in the electrical connection box 1.

When a tab-like terminal T of a fuse is pushed into and forcedly connected to the press contact slot 13 in the press contact tab 12 of the bus bar 10, the wings 14*a* and 14*b* outwardly deform on the opposite sides of the press contact slot 13. However, since the tab cover 20 closely encloses ends of the wings 14*a* and 14*b*, an elastic recovery force of the tab cover 20 returns the wings 14*a* and 14*b* from their deformed position to their original position. Accordingly, it is possible to bring the terminal T and press contact slot 13 into close contact with each other at a desired contact pressure.

Thus, even if the bus bar, having the press contact tab, is made of an aluminum-based metal plate, a fitting force exerted in a press contact connection is not reduced and reliability in electrical connection is enhanced.

Since the bus bar 10 is made of an aluminum-based metal, the mixing rate of copper to iron can be reduced. This relieves the copper problem upon recovery of iron during recycling of a car body in the prior art. It is also possible to enhance recyclability for a junked automobile. In addition, the bus bar 10, made of the aluminum-based metal, has rust-resistance characteristics and good workability as well as providing a lightweight electrical connection box.

The press contact tab 12, made of the aluminum-based metal plate, tends to buckle on account of a strong force when the terminal T is inserted into the press contact slot 13 in the press contact tab 12. However, since the tab cover 20, made of the stainless steel plate having a high stiffness, reinforces the press contact tab 12, it is possible to prevent the press contact tab from buckling.

Although the press contact tab 12, made of the aluminum-based metal plate, comes into contact with the tab cover, made of the stainless steel plate, there is no trouble with respect to electric corrosion.

Furthermore, when the terminal T is welded to the flat plate circuit 11, if a material to be welded is made of an iron-based metal, it is possible to reduce mixing of metal other than iron and to enhance the recovery of iron. Since aluminum does not denature an iron-based metal by a reaction with the iron-based metal, which is the main material of a car body, it is possible to enhance recovery of the iron-based metal.

Since the locking pawl 23*b* is provided on the tab cover 20, the tab cover 20 may be secured beforehand to the electrical connection box. The press contact tab 12 may be inserted into the tab cover 20 when the bus bar 10 is inserted into the tab cover 20. The locking pawl 15 engages the locking aperture 23*a* so that the tab cover 20 encloses the press contact tab 12.

Figure 4:
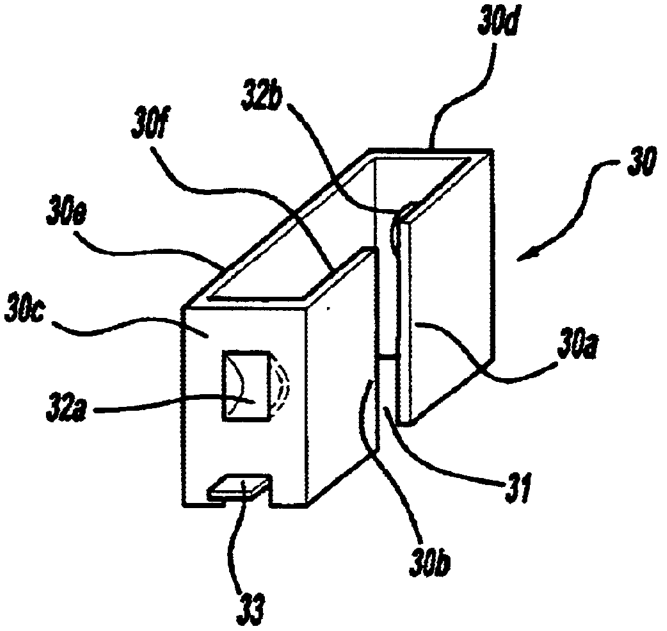
FIG. 4 is a perspective view of a tag cover to be used in a second embodiment of an electrical conductor assembly in accordance with the present invention.

FIG. 4 shows a tab cover to be used in a second embodiment of the electrical conductor assembly in accordance with the present invention. A tab cover 30, made of a stainless steel plate, in the second embodiment differs from the tab cover 20 in the first embodiment with respect to configuration.

The tab cover 30 is formed into a rectangular parallelepiped tube to enclose the press contact tab 12, as in the case of the first embodiment. A tab insertion groove 31 is defined between opposite ends 30*a* and 30*a* of the tab cover 30. Arcuately expanded spring sections 32*a* and 32*b* project inwardly from opposing sidewalls 30*c* and 30*d* at outer end surfaces of the wings 14*a* and 14*b* of the press contact tab 12. Clearances are defined between sidewalls 30*e* and 30*f* perpendicular to the sidewalls 30*c* and 30*d* and the press contact tab 12.

Figure 5A:
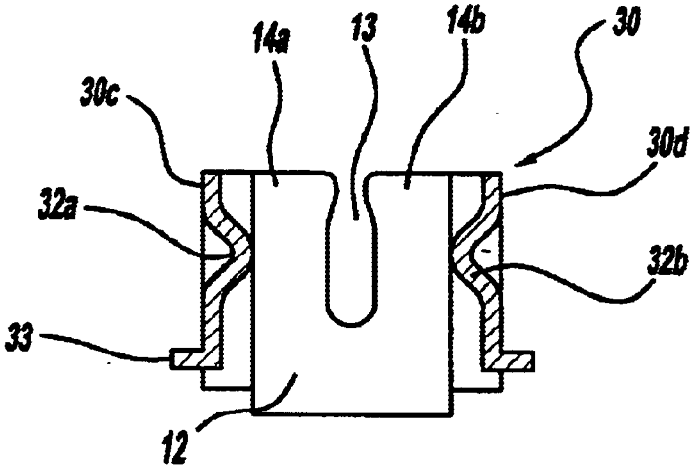
FIG. 5A is a cross section view of the tab cover in which the press contact tab is contained.

Furthermore, a locking piece 33 (FIG. 5A) projects from a lower end of each of the sidewalls 30*c* and 30*d* toward the electrical connection box 1. The bus bar 10 produced by a folding work, is made of an aluminum-based metal plate, as in the case of the first embodiment.

When the press contact tab 12 is inserted into the tab cover 30, the wings 14*a* and 14*b* of the tab 12 are clamped by the spring sections 32*a* and 32*b* of the tab cover 30. Accordingly, the wings 14*a* and 14*b* approach each other. The press contact tab 12 is incorporated in the tab cover 30 by an elastic clamping force.

Figure 5B:
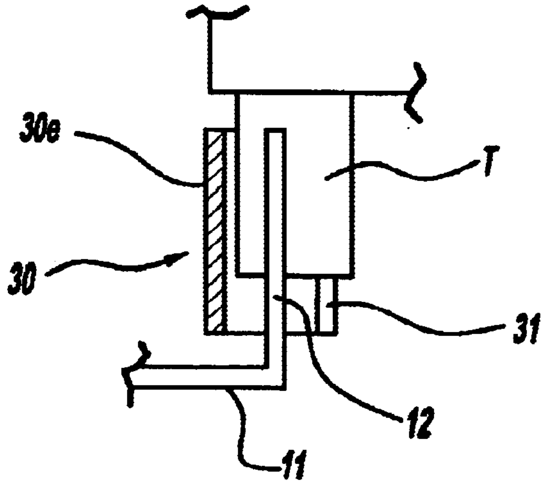
FIG. 5B is a section view of the tab cover in which a terminal of a relay is pushed into the press contact tab.

When a tab-like terminal T of a fuse or a relay is forcedly pushed into the press contact slot 13 in the press contact tab 12, as shown in FIG. 5B, a side end of the terminal T passes through the tab insertion groove 31 to prevent interference with the tab cover 30.

The wings 14*a* and 14*b* are deformed outwardly when the terminal T is inserted into the press contact slot 13 in the press contact tab 12. However, since the spring sections 32*a* and 32*b* of the tab cover 30 bias the wings 14*a* and 14*b* to approach each other, the wings 14*a* and 14*b* return from their deformed positions to their original positions. This will maintain a desired contact pressure between the terminal T and the press contact tab 12.

In the second embodiment, after the tab cover 30 is attached to the electrical connection box 1, the press contact tab 12 of the bus bar 10 may be inserted into the tab cover 30. Alternatively, before attaching the tab cover 30 to the box 1, the tab cover 30 may be mounted on the press contact tab 12.

Figure 6:
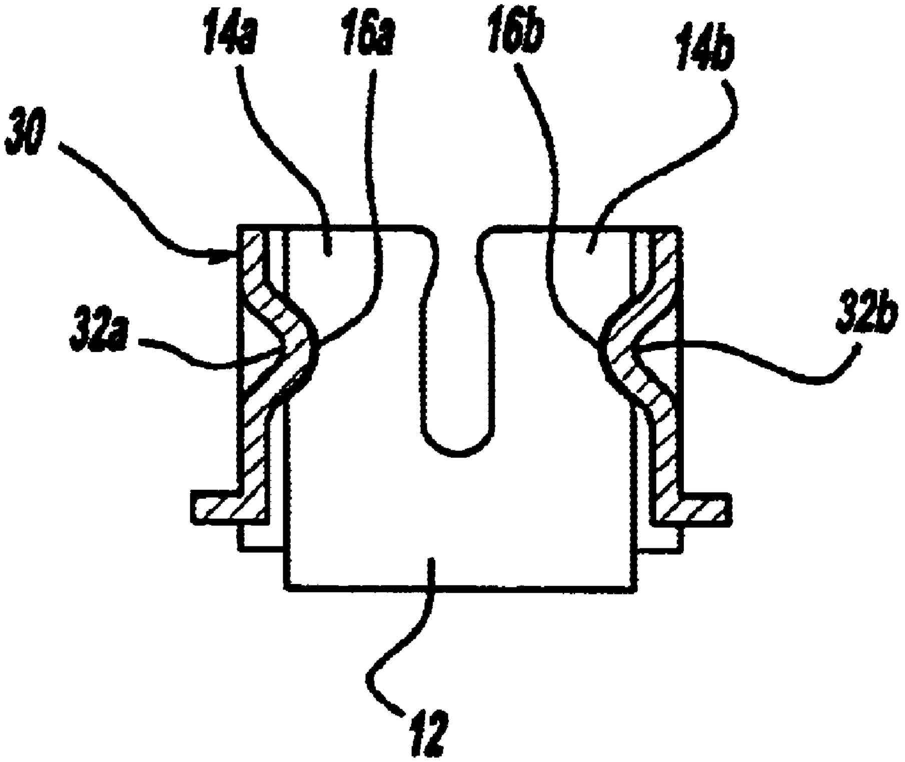
FIG. 6 is a cross section view of an alteration of the tab cover to be used in the second embodiment of the electrical conductor assembly in accordance with the present invention.

FIG. 6 shows an alteration of the second embodiment of the electrical conductor assembly in accordance with the present invention. The wings 14*a* and 14*b* of the press contact tab 12 include depressions 16*a* and 16*b* on the positions opposed to the spring sections 32*a* and 32*b* of the tab cover 30. The spring sections 32*a* and 32*b* engage the depressions 16*a* and 16*b*.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electrical conductor assembly adapted to be contained in an electrical connection box to be mounted on an automobile, comprising:

a bus bar produced by punching an aluminum-based metal plate into a desired circuit configuration, said bus bar including a press contact tab formed by bending an end of said bus bar; and a reinforcing tab cover enclosing an exterior of said press contact tab;

said press contact tab having a press contact slot extending from a distal end of said tab to a proximal end of said tab, said tab cover made of an elastic iron-based metal plate, and said tab cover including insertion grooves in opposed sidewalls that communicate with said press contact slot in said press contact tab.

2. An electrical conductor assembly according to claim 1, wherein said tab cover is made of a stainless steel plate and said bus bar is contained in said electrical connection box after said tab cover is fixed on said press contact tab, or said press contact tab engages said tab cover that is fixed on said electric connection box beforehand when said bus bar is contained in said electric connection box.

3. An electrical conductor assembly according to claim 1, wherein said tab cover is formed into a rectangular parallelepiped tube that fits closely around the exterior of said press contact tab.

4. An electrical conductor assembly according to claim 1, wherein said contact tab includes wide surfaces having said press contact slot and narrow end surfaces arranged perpendicular to said wide surfaces, said tab cover having accurately and inwardly expanded spring sections on opposed sidewalls adjacent to said narrow end surfaces of said tab, said expanded spring sections elastically clamp said narrow end surfaces of said tab to bias said tab so as to force wings on opposite sides of said press contact slot toward each other.

5. An electrical conductor assembly according to claim 1, wherein said tab cover is provided with a locking piece that passes through and engages with a locking aperture formed in said electrical connection box.

6. An electrical conductor assembly according to claim 1, wherein said press contact tab includes a locking pawl, said tab cover having a locking piece that engages said locking pawl, said tab cover is locked on said press contact tab.

* * * * *

UNITED STATES PATENT AND TRADEMARK OFFICE

CERTIFICATE OF CORRECTION

PATENT NO. : 6,723,924 B2
DATED : April 20, 2004
INVENTOR(S) : Yuasa et al.

It is certified that error appears in the above-identified patent and that said Letters Patent is hereby corrected as shown below:

Column 6,
Line 15, "30a and 30a" should be -- 30a and 30b --

Column 8,
Line 4, (1st occurrence), after first ocurrence of "said", insert -- press --

Signed and Sealed this

Eighth Day of February, 2005

JON W. DUDAS
*Director of the United States Patent and Trademark Office*